United States Patent
Goguen

[11] Patent Number: 6,098,261
[45] Date of Patent: Aug. 8, 2000

[54] TOOL AND METHOD FOR WORKING WHEEL BEARINGS

[76] Inventor: Roland Goguen, R.R. #1, P.O. Box 4408, Robichaud, New Brunswick, Canada, E0A 2S0

[21] Appl. No.: 09/136,190

[22] Filed: Aug. 19, 1998

[30] Foreign Application Priority Data

Aug. 28, 1997 [CA] Canada .................................. 2214137

[51] Int. Cl.[7] .................................................. B25B 27/14
[52] U.S. Cl. ............................... 29/275; 29/263; 29/278; 29/280; 29/282
[58] Field of Search ............................ 29/275, 278, 280, 29/282, 263

[56] References Cited

U.S. PATENT DOCUMENTS

| | | |
|---|---|---|
| 2,861,330 | 11/1958 | Kratz . |
| 2,971,254 | 2/1961 | Fairfield . |
| 3,123,902 | 3/1964 | Isenbarger . |
| 3,358,353 | 12/1967 | Bares . |
| 3,602,969 | 9/1971 | Provost ................................. 29/275 |
| 3,651,553 | 3/1972 | Dodd . |
| 4,050,136 | 9/1977 | Shultz . |
| 4,080,734 | 3/1978 | Barbour ................................ 29/275 |
| 4,288,900 | 9/1981 | Overton ................................ 29/263 |
| 4,429,447 | 2/1984 | Davis . |
| 4,794,683 | 1/1989 | Pacheco ................................ 29/278 |
| 4,852,235 | 8/1989 | Trease et al. ........................ 29/263 |
| 5,174,006 | 12/1992 | Ellis . |

*Primary Examiner*—James G. Smith
*Assistant Examiner*—Lee Wilson
*Attorney, Agent, or Firm*—Mario D. Theriault

[57] ABSTRACT

A tool kit for working wheel bearings, comprising at least a first punch for removing bearing cups from a wheel hub of a vehicle. The first punch comprises an elongated handle and a first punch head having a first effective width. The structure of the first punch head is such that when the first effective width thereof is selected to correspond to an inside diameter of first and second spaced-apart similar bearing cups in a wheel hub of a vehicle, the first punch head is usable for insertion through one of the bearing cups and for working one bearing cup at the time out of the wheel hub. In another aspect of the present invention, the tool kit comprises a second punch having a bearing retainer mounted thereon. The bearing retainer has a pair of spaced-apart fingers each having a tab extending outwardly. The second punch is usable for pushing a bearing cone and roller assembly out of a bearing cup and for pushing an oil seal out of its seat in a wheel hub, while holding the bearing cone and roller assembly thereto and preventing the bearing cone and roller assembly from falling to the ground when the oil seal pops out of its seat. In other aspects of the present invention, the tool kit comprises a disc, a circular plate and a pair of wing nuts usable with the disc and plate for installing bearing cups, bearing cones, and oil seals in a wheel hub.

17 Claims, 8 Drawing Sheets

TOOL AND METHOD FOR WORKING WHEEL BEARINGS

FIELD OF THE INVENTION

This invention pertains to tools for removing and installing wheel bearings, and more particularly, it relates to a kit of rigid tools for working cup and cone bearings in transport truck and trailer wheels.

BACKGROUND OF THE INVENTION

Wheel bearings of transport trucks and trailers are normally inspected on a regular basis, at three month intervals for example, for preventing bearing failures and the associated losses of wheels known for their regrettable consequences. These inspections are often performed by the personnel of specialized garages, and normally comprise the examination of both bearings in a same wheel hub and the replacement of the oil seal and lubricant.

In some garages, however, the time allowed for doing these inspections is a fixed period per axle. In many cases, the truck or trailer condition does not lend itself to a swift inspection, and therefore the disassembly and reinstallation of the bearings may not always be effected as taught by the bearing manufacturer. Moreover, the removal of worn bearings and installation of new ones is often effected with tools that are adjustable with pivot pins, slots and screws. These tools have a tendency to loosen, to wear out and slip, damaging the bearing seats and bearing races.

A first example of an adjustable bearing remover of the prior art is described in U.S. Pat. No. 3,358,353 issued on Dec. 19, 1967 to Jack A. Bares et al. In this example, the device comprises a pair of prongs with notches on a driven end of these prongs, and an anvil cap enclosing the driving end. The prongs are movable about a pivot axis in the anvil cap, to adjust the notches to different diameters of bearings. When the notches are engaged with the edge of a bearing race, a hammer is used to strike the anvil cap and push the bearing race out of its seat.

A second example of a bearing race driver is described in U.S. Pat. No. 4,050,136 issued on Sep. 27, 1977 to William E. Shultz. This tool is an impact type tool made of six conical grooved segments that are held together by a resilient retainer against a conical wedge member. The adjustment of the wedge member along a threaded rod causes the grooved segments to expand to different diameters.

A third example of an impact tool for working bearings is described in U.S. Pat. No. 4,429,447 issued on Feb. 7, 1984 to Marvin A. Davis. The bearing cup installation tool described therein has three prongs that are movable toward and away from each other about respective pivots in a core block. Each prong is movable by the adjustment of a cam disc along a threaded rod extending from the core block, to cause the cam disc to slide along a respective cam bar on each prong.

In reality, impact tools that are made of several moving parts are often improperly adjusted, causing the tools to deflect and often slip out of its engagement with a bearing cup or cone. Repeat impacts on these tools often cause the moving parts to loosen up and adversely affect the adjustability of the tools. As a result, the bearing jobs done in many garages are often carried out using defective tools, and the bearing installations are sometimes below acceptable quality standards.

Furthermore there are still, unfortunately, many garages and truck owners that use pointed punches and chisels for removing bearing cups from a wheel hub. The use of such tools is common amongst the untrained and the self-taught auto-mechanics, with the deplorable consequences of damaging bearing seats and shortening the life of all subsequent bearing installations.

SUMMARY OF THE INVENTION

In the present invention, however, there is provided a tool kit containing several tools and associated parts that are designed to allow an easy and efficient removal and installation of bearing cones and cups from and into a wheel hub.

In a first aspect of the present invention, the tool kit comprises a first punch for removing bearing cups from a wheel hub of a vehicle. The first punch comprises an elongated handle having a longitudinal axis and a first punch head having a first central axis and a first punch-head body. The first punch-head body is mountable to the elongated handle in a co-axial relationship with the handle.

A first crossbar is mounted on the first punch-head body, in a perpendicular relationship with the first central axis, with a midpoint thereof on the first central axis. The crossbar has first and second ends defining therebetween a first effective width of the first punch head.

The first end of the crossbar is braced to the first punch-head body by a first triangular gusset having a first long side making a first acute angle with the first central axis. The second end of the crossbar is also braced to the first punch-head body by a second triangular gusset having a second long side making a second acute angle with the first central axis. The first long side is longer than half the effective width of the first punch head, and a projection of the second end measured from the first long side in a direction perpendicular to the first long side is shorter than the first effective width of the first punch head.

The structure of the first punch head is such that when the first effective width thereof is selected to correspond to an inside diameter of first and second spaced-apart similar bearing cups in a wheel hub of a vehicle, the first punch head is usable for insertion through one of the bearing cups and for working one bearing cup at the time out of the wheel hub.

In another aspect of the present invention, the tool kit also comprises a second punch for simultaneously removing a bearing cone, a bearing roller assembly and an oil seal from a wheel hub of a vehicle. The second punch comprises a second punch head having a second central axis and a second punch-head body mountable on the elongated handle with the second central axis thereof in a co-axial relationship with the longitudinal axis of the handle.

There is also provided a second crossbar mounted on the second punch-head body, perpendicularly to the second central axis with a midpoint thereof on the second central axis. The second crossbar has first and second extremities defining therebetween a second effective width of the second punch head. A bearing retainer is mountable on the elongated handle next to the second punch-head body. The bearing retainer has a pair of spaced-apart fingers each having an outside edge extending perpendicularly from the second crossbar, and each finger has a tab extending outwardly relative to the second central axis and a respective outside edge, with a distance between the tabs being slightly smaller than the second effective width of the second punch head.

A primary advantage of the second punch is that it is usable for pushing a bearing cone out of a bearing cup and for pushing an oil seal out of its seat in a wheel hub, while holding the bearing cone thereto and preventing the bearing cone and roller assembly from falling to the ground when the oil seal pops out of its seat.

In another aspect of the present invention, the tool kit also comprises a disc mountable to the elongated handle and a first wing nut adjustably mountable on the elongated handle next to the disc for retaining a bearing cup against the disc. The disc has a raised circular shoulder for retaining a bearing cup in a concentric relationship therewith. The disc and the first wing nut are particularly advantageous for properly installing a bearing cup in a wheel hub.

In a further aspect of the present invention, the tool kit also comprises a circular plate and a second wing nut adjustably mountable on the elongated handle for retaining a bearing cone, a roller assembly and an oil seal against the circular plate. The circular plate has a circular recess therein for retaining an oil seal in a concentric relationship therewith. The second wing nut has a pair of notches therein for retaining a bearing cone in a concentric relationship with the circular plate. The circular plate and the second wing nut are usable for holding a bearing cone, a roller assembly and an oil seal together and for installing these parts in a wheel hub in a single movement.

The tool kit of the present invention allows a mechanic to remove and inspect a set of bearings or to install a new set of bearings in a fraction of the time required by the conventional methods. The tool kit of the present invention further ensures that the bearing races and seats do not get damaged during the inspection job or distorted during the re-assembly procedure, in order to ensure a maximum life out of a set of bearings.

BRIEF DESCRIPTION OF THE DRAWINGS

The preferred embodiment of the invention will be further understood from the following description, with reference to the drawings in which.

DETAILED DESCRIPTION OF THE PREFERRED EMBODIMENT

Figure 1:
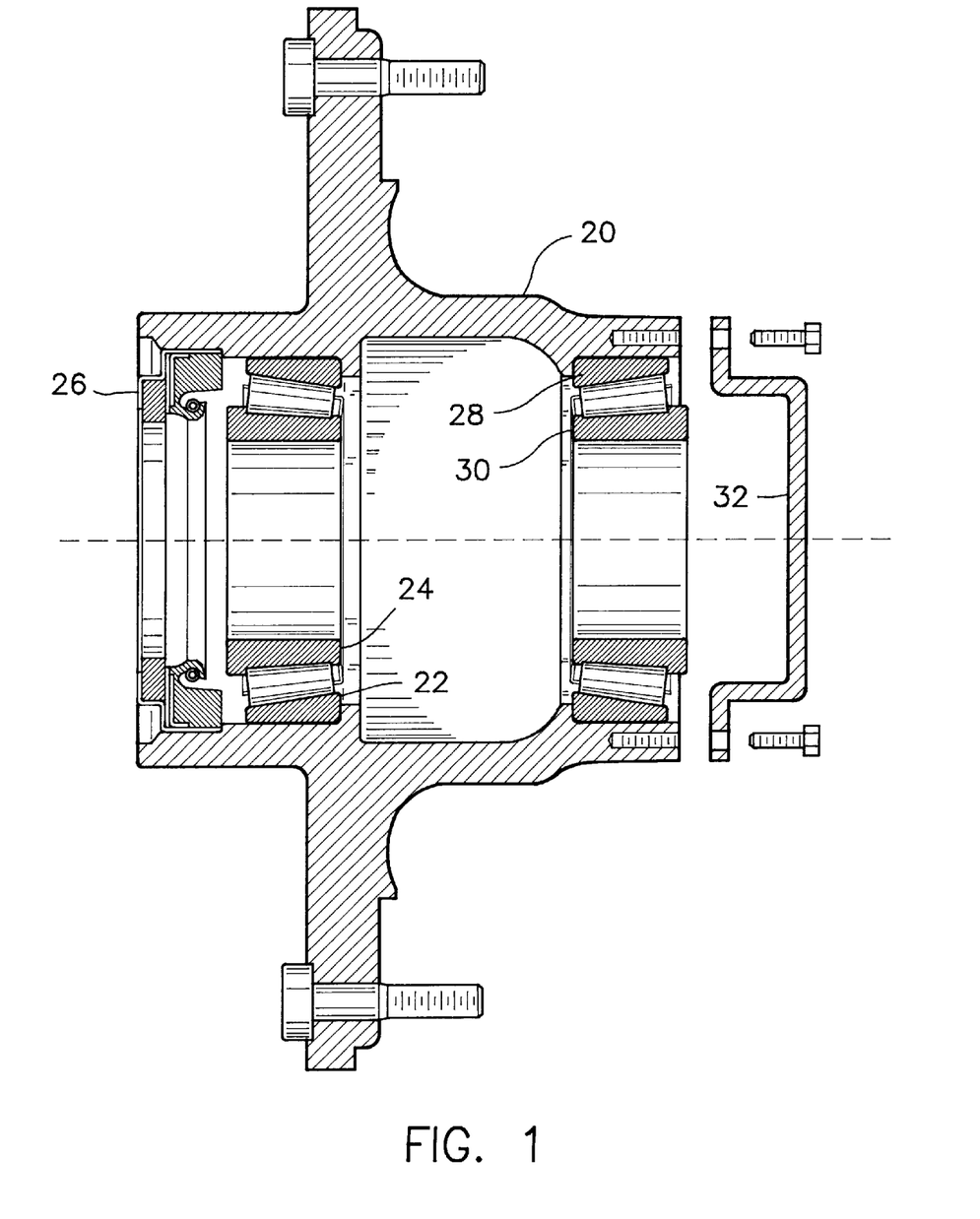
FIG. 1 is a cross-section view of a typical transport trailer wheel hub showing a common installation of a pair of cup and cone bearings therein.
Figures 2, 3:
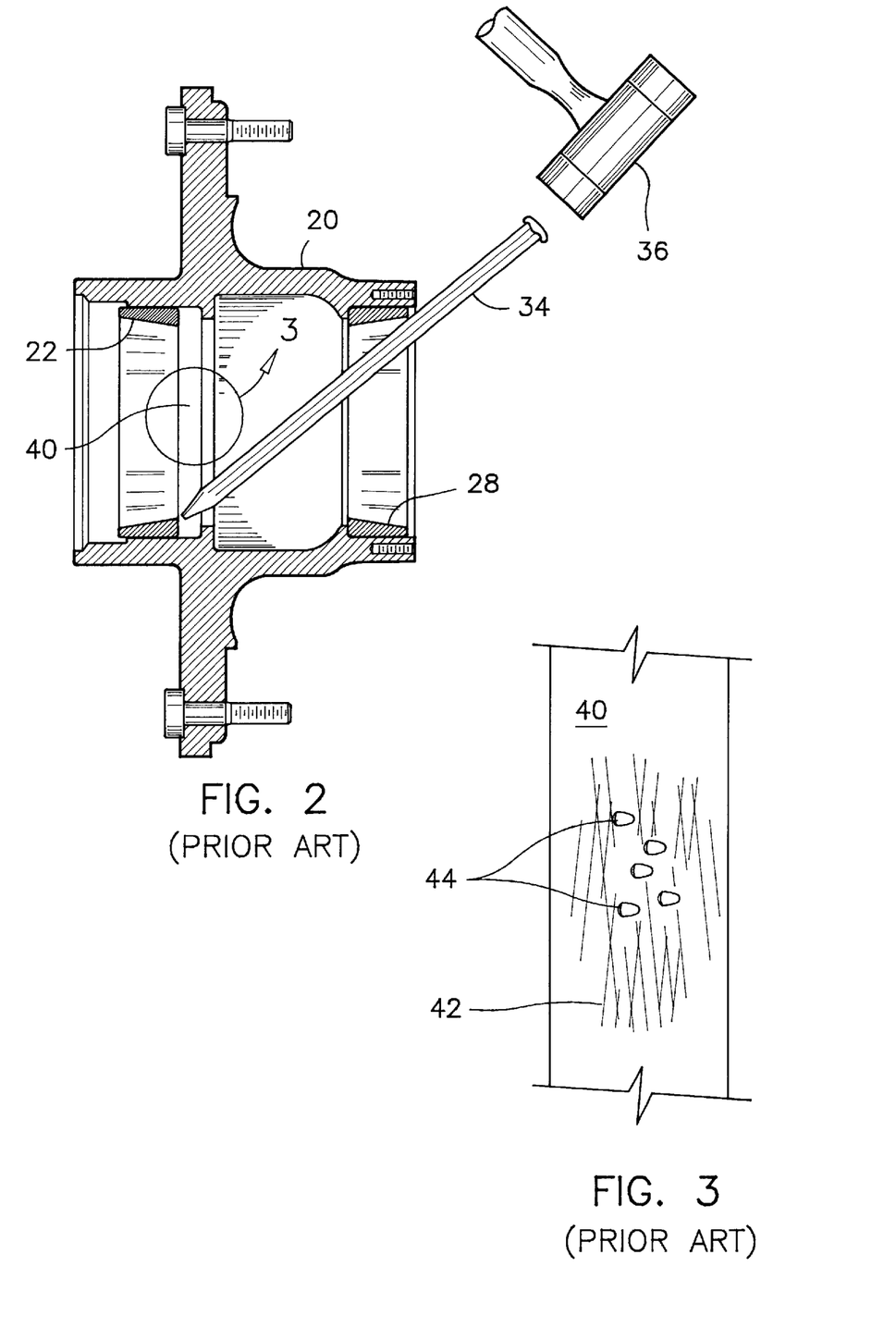
FIG. 2 is another cross-section view of a typical wheel hub showing one method of the prior art for removing bearing cups from the wheel hub.
FIG. 3 is an enlarged view of detail circle 3 in FIG. 2, showing common damage to a bearing seat in a wheel hub.

In order to better understand the advantages of the tool kit of the preferred embodiment, reference is firstly made to FIGS. 1–3 on the drawing sheets attached herewith. FIG. 1 illustrates a typical wheel hub 20 of a transport trailer. The hub 20 has an inner bearing comprising an inner cup 22 and an inner cone with roller assembly 24 and an oil seal 26 near the inner bearing. The hub 20 also comprises an outer bearing comprising an outer cup 28 and an outer cone with roller assembly 30. The hub 20 further has a cover 32 covering the outer end thereof. The cover 32 may have a sight glass (not shown) for verifying the level of lubricant inside the hub.

During a typical bearing replacement job, the cup of each bearing is removed from the hub with a punch 34 or chisel and a hammer 36 as shown in FIG. 2. Numerous strokes are needed while alternating the position of each blow around the cup 22.

The major drawback of this method is that the cup 22 is not maintained in a plane parallel to the plane defined by the bearing seat 40 while being pushed out of the bearing seat 40. The impact of the punch 34 against the cup causes the cup 22 to move a little bit on one side, then a little bit on the other side, and so on until it is completely out of the bearing seat 40. When the cup 22 is alternatively tilted sideways in this manner, it stretches the metal of the bearing seat 40 causing deformations often visible as a diamond-shaped hatching 42 as illustrated in FIG. 3.

Another common drawback with the use of a pointed tool 34 and hammer 36 is that the punch, as one can imagine, does not always strike against the bearing cup 22. Consequently, punch marks 44 are often visible in a bearing seat 40. Even if these hatching 42 and marks 44 are sanded off, filed or ground, imperceptive metal deformations exceeding the tolerable bearing seat defects may remain. Such small defects are often sufficient for causing a premature bearing failure.

Typical bearings in wheel hubs of transport trailers are taper roller bearings having an outer diameter of between 4½ to 5 inches. A maximum raceway radial runout for these bearings, as taught by one bearing manufacturer is two tenths of one thousandth of an inch (0.0002 inch). Considering such high precision requirement in the roundness of the bearing seat 40, one skilled in the art will appreciate that a partially ground punch mark 44 or hatching lines 42 in the bearing seat 40, although hardly visible, can deform a bearing cup to an out of roundness defect being several times the permissible extent. For these reasons, the punch marks 44 and hatching lines 42 in bearing seats 40, are believed to be a major cause of premature bearing failures in wheels of transport trucks and trailers.

In the tool kit of the preferred embodiment, however, there is provided a first T-shaped punch 50 which is particularly advantageous for removing a bearing cup from a wheel hub without damaging the bearing seat. The first T-shaped punch 50 is illustrated in FIGS. 4–7.

Figure 4:
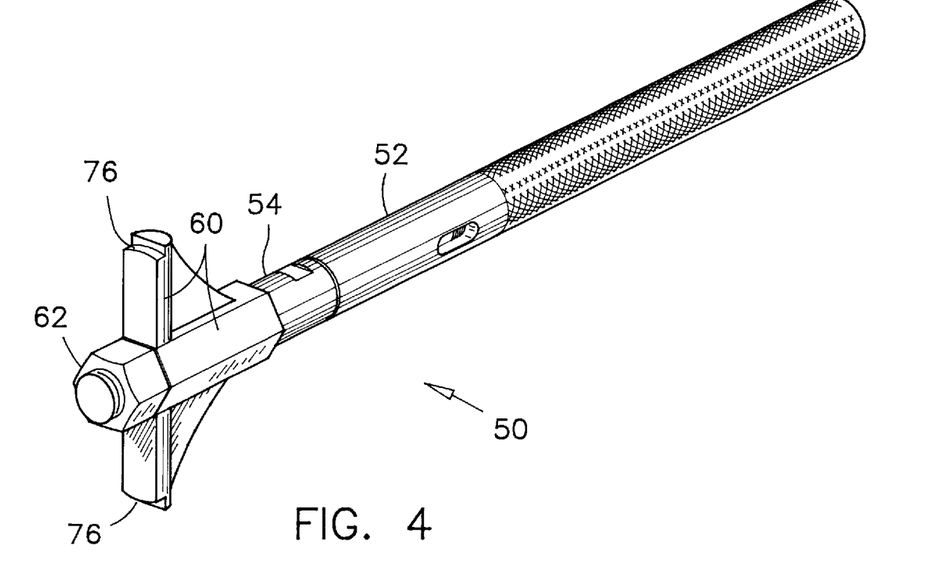
FIG. 4 is a perspective view of the first T-shaped punch included in the tool kit of the preferred embodiment.
Figures 6, 7:
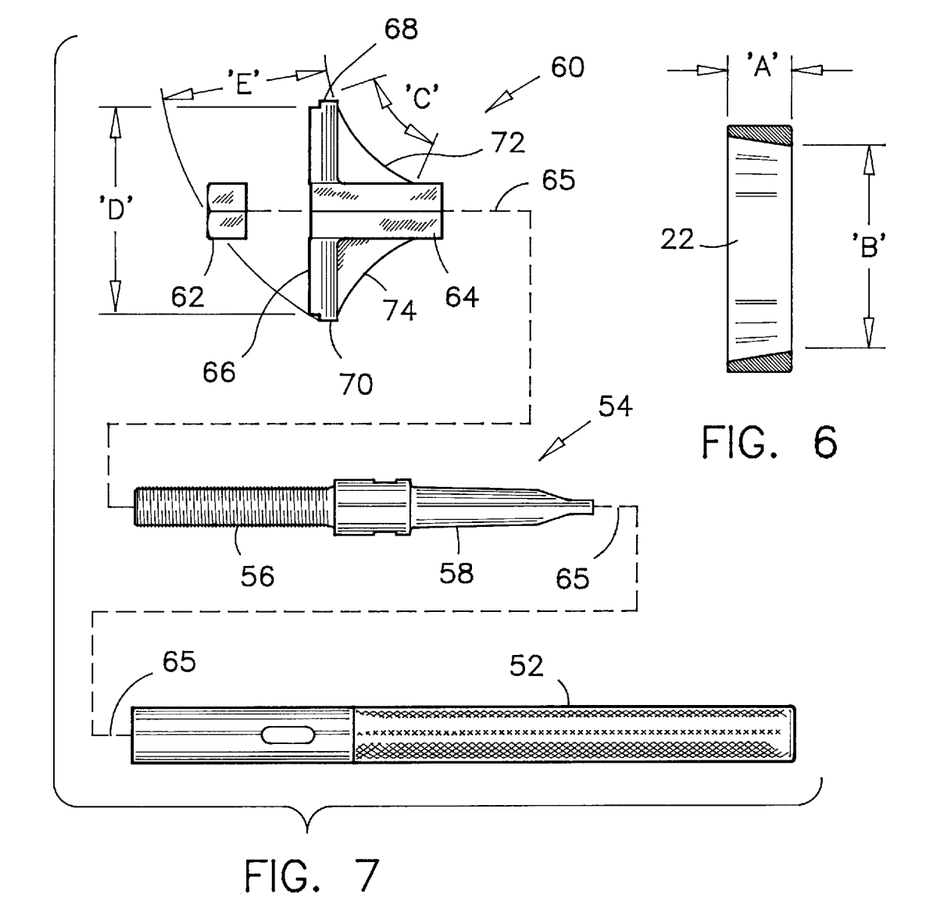
FIG. 6 is a cross-section view of a common bearing cup and reference dimensions thereof.
FIG. 7 is an exploded view of the first T-shaped punch included in the tool kit of the preferred embodiment.

The first T-shaped punch 50 comprises a handle 52, a mandrel 54 having a threaded portion 56 and a taper portion 58, and a first punch head 60 mounted on the threaded portion 56 of the mandrel 54, in a co-axial relationship with the mandrel. The first punch head 60 has a hollow threaded core which is threaded on the mandrel 54 and locked by a nut 62. The preferred size of threads on the threaded portion 56 is ⅞ inch-National-Fine-threads, and the preferred nut 62 has an across-flat dimension of 1 7/16.

The first T-shaped punch head 60 is a solid piece comprising a punch-head body 64 preferably made from a piece of a hexagonal bar stock also having an across-flat dimension of 1 7/16 inch. The first T-shaped punch head 60 has a crossbar 66 mounted perpendicularly relative to the longitudinal axis 65 of the hexagonal body 64 on one end of the hexagonal body 64. It should be noted that the longitudinal axis 65 of the punch head 60 is the same as the longitudinal axis of the mandrel 54 and of the longitudinal axis of the handle 52.

The crossbar 66 is preferably a round rod or a square bar having a cross-section not exceeding about ¾ inch. The crossbar 66 has a first end 68 and a second end 70. The first end 68 is braced to the punch-head body 64 by a first triangular gusset 72 and the second end 70 is also braced to the body by a second triangular gusset 74. The longer sides of these triangular gussets are preferably slightly arced toward each other.

Other important dimensions of the first T-shaped head 60 are explained as follows. Referring particularly to FIG. 6, it has been found that the width 'A' of a bearing cup 22 is normally less than half the inside diameter 'B' of that cup. In fact, a ratio of these dimensions for wheel bearings used in transport truck and trailer wheels is in most cases smaller than about 0.4. Referring now to FIG. 7, the preferred length 'C' of the long side of the first gusset 72 is more than half the effecting width 'D' of the punch head 60. The projection 'E' of the second end 70 of the crossbar 66 measured along the longer side of the first gusset 72, in a direction normal to the longer side of the first gusset 72 is smaller than the effective width 'D'. A punch head 60 is selected such that the effective width 'D' corresponds to the inside diameter 'B' of a bearing cup 22.

Figure 5:
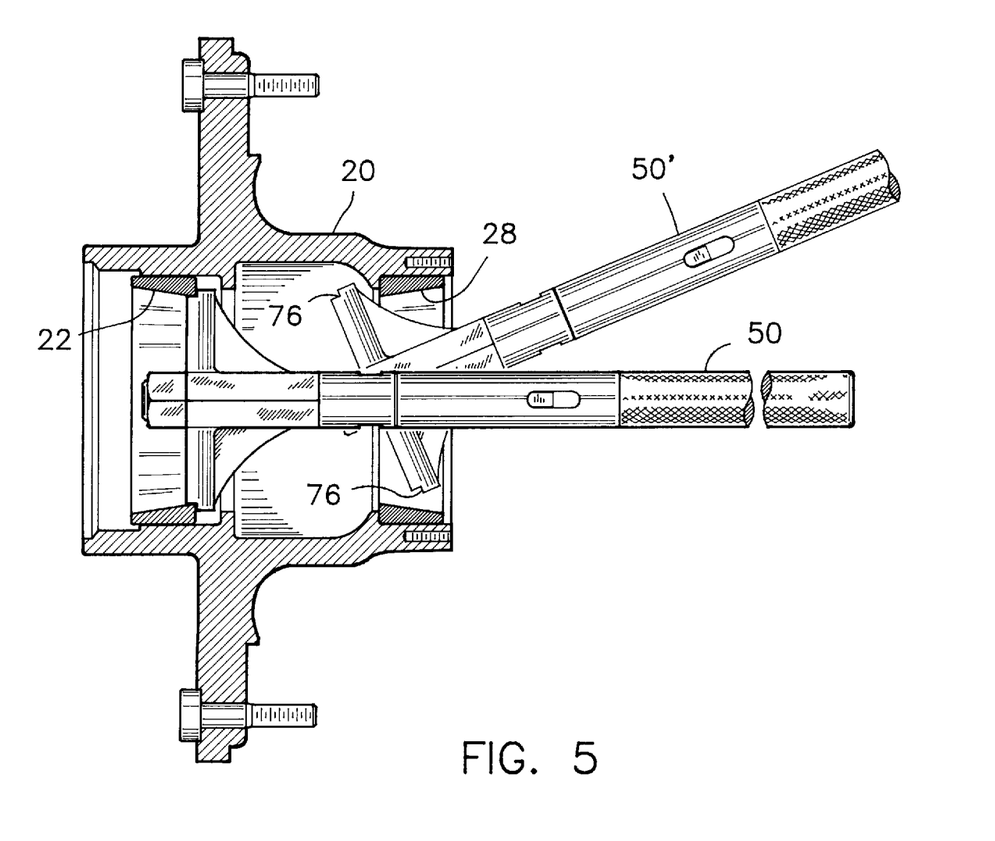
FIG. 5 is a cross-section view of a common wheel hub and a first T-shaped punch in two different positions, showing the first T-shaped punch in use for removing a bearing cup from a wheel hub.

The above-described shape and combination of dimensions 'C', 'D' and 'E' are important for allowing the introduction of the first T-shaped punch 50 inside a wheel hub 20 for the purpose of removing the first bearing cup, when both bearing cups 22,28 for example are of a same size. The first T-shaped punch 50' is tilted sideways as illustrated in FIG. 5, moved inside the outer bearing cup 28 and inside the hub. The first T-shaped punch 50 is then aligned with the longitudinal axis of the hub 20 and move against the inner bearing cup 22.

Notches 76 are provided on both ends of the crossbar 66 for engagement with the bearing cup 22. The spacing 'D' between opposed notches 76 is substantially equal to the inside diameter 'B' of the bearing cup 22 such that the handle of the first T-shaped punch 50 remains aligned with the center of the bearing cup 22.

When the first T-shaped punch 50 is properly positioned against the inner cup 22 as shown in FIG. 5, a hammer (not shown) is used to strike the end of the handle of the punch 50 while manually rotating the handle of the punch about its longitudinal axis. The bearing cup 22 is evenly forced out of the bearing seat without unduly stretching the metal of the bearing seat 40.

During the removal of the cup 22, the first T-shaped punch 50 remains centered about the bearing cup 22 thereby preventing striking and marking the bearing seat 40 with the punch. In that respect, the handle 52 of the tool is preferably about 15 inches in length to facilitate the alignment thereof with the central axis of the hub. The same procedure is repeated for removing the outer cup 28.

It will be appreciated that when both bearing cups have different sizes, the small cup is preferably removed first and the larger one removed last. In such case, two different sizes of first T-punches 50 are required. In general, hub wheels of transport trucks and trailers have a common size. A single tool kit of the preferred embodiment is useable for working the bearings of most makes of trucks and trailers. Additional tools may at times be required for doing the odd-size wheel hubs.

Figure 8:
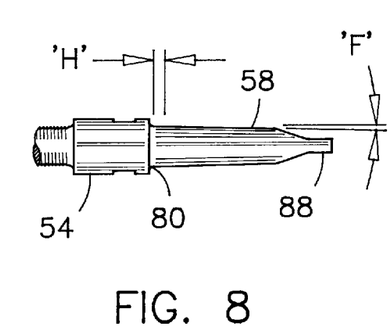
FIG. 8 is partial side view of the mandrel used with several tools in the tool kit of the preferred embodiment.
Figure 9:
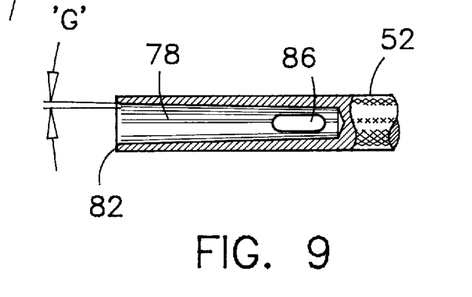
FIG. 9 is a partial cross-section view of the handle used with several tools included in the tool kit of the preferred embodiment.

Referring now to FIGS. 8 and 9, the connection between the mandrel 54 and the handle 52 of the first T-shaped punch 50 is that of a taper shank and taper sleeve. Although these connections are well known in the field of machine shop tooling, the connection referenced herein is somewhat different from the usual taper shank and sleeve connection. The taper portion 58 preferably has a taper angle 'F' of about 1½° and the taper angle 'G' inside the taper opening 78 in the handle 52 is preferably about 1¾°. This loose fit of ¼° between the mating parts has been found to cause a tight engagement of the handle over the mandrel over a distance 'H' of about ⅛ inch only, for preventing the binding of the handle 52 over the mandrel 58 when striking the handle 52 with a hammer.

Furthermore, the mandrel 54 has a large shoulder 80 to abut against the forward edge 82 of the taper opening 78 in the handle 52. This shoulder 80 absorbs the impact from the hammer, while the relaxed taper engagement maintains a slight cohesive force between the handle 52 and the mandrel 54.

Figure 16:
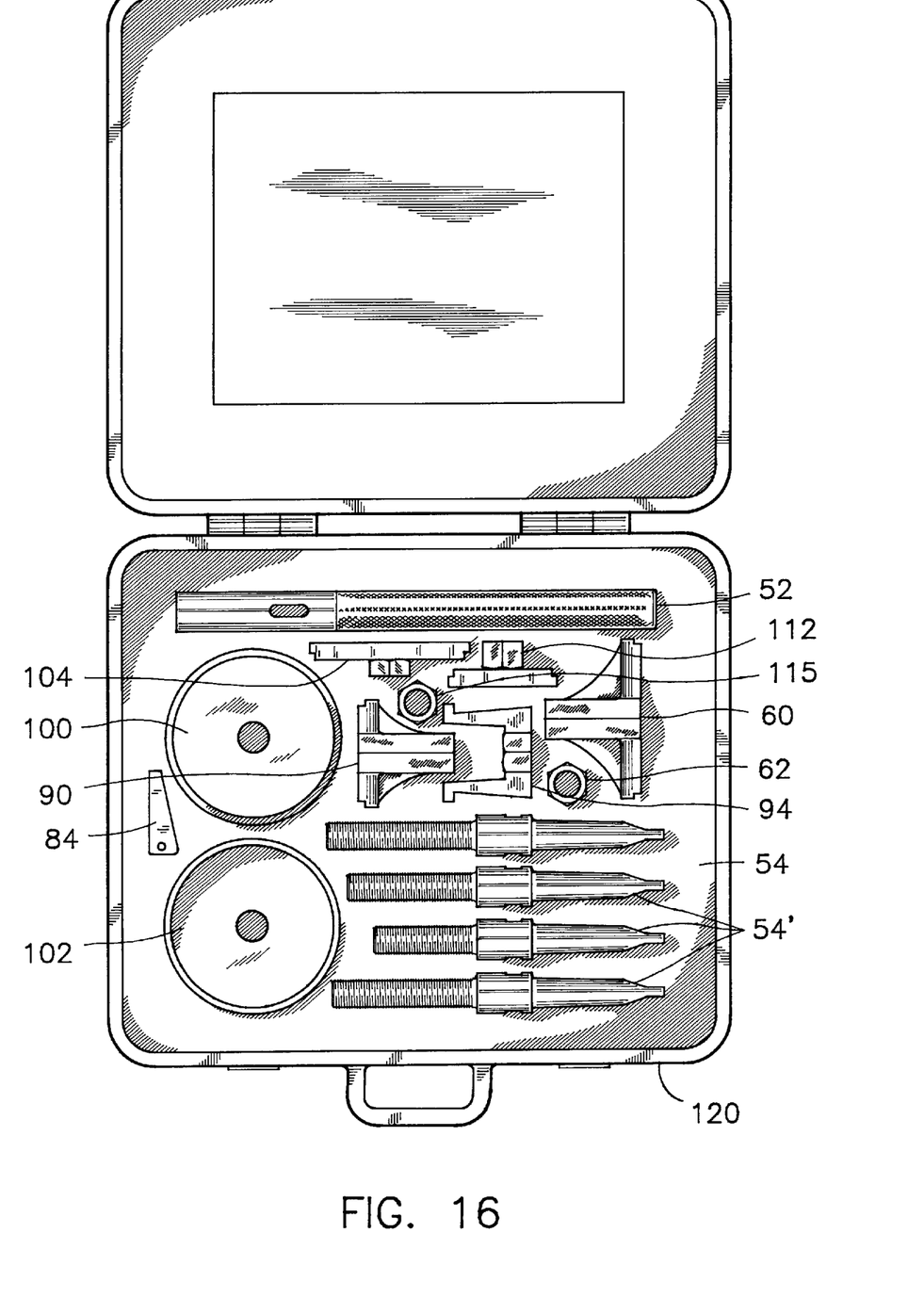
FIG. 16 illustrates the entire tool kit of the preferred embodiment.

The mandrel 54 is relatively easily removable from the handle 52 by inserting a triangular key 84 (as shown in FIG. 16) into the oblong hole 86 through the handle 52, to act upon a tab 88 on the small end of the mandrel 54 and to release the mandrel from the taper sleeve 78 of the handle 52, as is customary with machine shop tooling.

Another problem associated with the examination of wheel bearings of transport trailers is the fact that the removal of the oil seal 26 as illustrated in FIG. 1, is effected by striking the inner bearing cup and roller assembly 24, until the oil seal 26 is pushed out of its seat inside the hub 20. In addition to possibly damaging the inner cone and roller assembly 24 with a striking bar, the inner cone and roller assembly 24 often fall off the wheel hub when the seal 26 pops out of its seat. When the inner cone and roller assembly 24 fall on a concrete floor for example, damage may occur in the form of a nick or a scratch on a roller or a crack in the cone of the bearing assembly. Such damage may not be readily noticeable but still be largely sufficient to cause the bearing to fail prematurely. Other bearing problems associated with these incidents are caused by the abrasive particles found on most floors and which remain lodged in the lubricant covering the bearing parts. When these bearing parts are reassembled in the wheel hub, the particles can quickly abrade a bearing surface.

Figure 10:
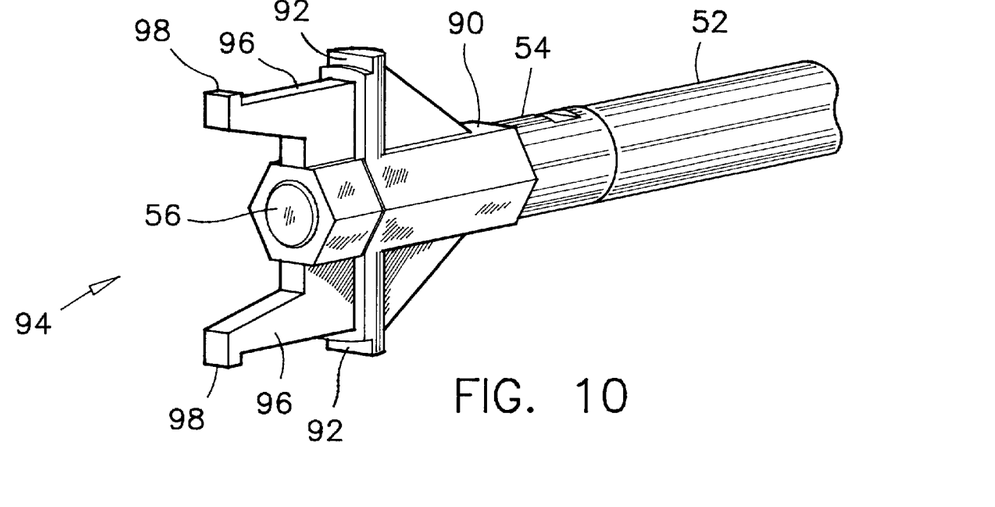
FIG. 10 is a perspective view of a second T-shaped punch included in the tool kit of the preferred embodiment.
Figure 11:
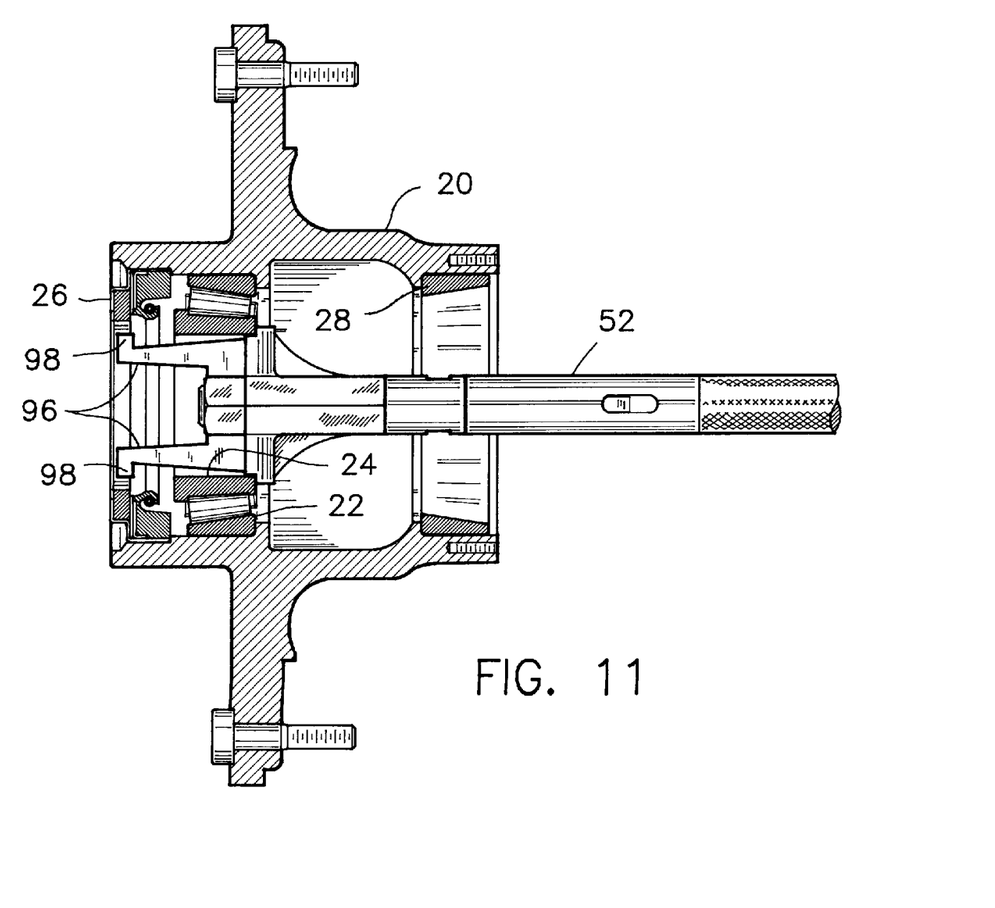
FIG. 11 is a cross-section view of a common wheel hub and a second T-shaped punch, showing the removal of an oil seal and inner bearing race from the hub using the second T-shaped punch.

As illustrated in FIGS. 10 and 11, the tool kit of the preferred embodiment comprises a second T-shaped punch 90 which has notches 92 spaced apart a distance equivalent to the inside diameter of the inner cone 24. A bearing retainer 94 is mounted to the front face of the second T-shaped punch 90. The retainer 94 comprises a locknut which is mounted onto the threaded portion 56 of the mandrel 54 extending through a hollow threaded core in the body of the second T-shaped punch 90. The bearing retainer 94 has a pair of spaced-apart fingers 96 extending longitudinally relative to the longitudinal axis of the second T-shaped punch 90. Each finger 96 has a tab 98 extending outwardly relative to the longitudinal axis of the second T-shaped punch 90.

The length of each finger between the tab 98 and the face of the second T-shaped punch 90 is about one and one half to twice the width of the inner cone 24. The projection of each tab 96 from the outer edge of each finger is about 1/8 inch. The distance across the radial projections of both tabs 98 is slightly smaller than the inside diameter of the inner cone 24.

When the second T-shaped punch 90 with the bearing retainer 94 mounted thereon is used for pushing the inner cone and roller assembly 24 and the oil seal 26 out of the hub 20, the inner cone and roller assembly 24 remains hung to the tabs 98 of the bearing retainer when the seal 26 pops out of its seat. The inner cone and roller assembly 24 may thereby be delicately removed from the retainer 94 and placed on a clean work bench or other neat surface. If that inner cone and roller assembly 24 is found to be in a mint condition, this state is thereby maintainable until it is reinstalled inside the hub 20.

It will be appreciated that the bearing retainer 94 described herein may also be used with the first T-shaped punch 50 for retaining a ball-type bearing being removed for example. When the first T-shaped punch 50 is used to remove two bearings of the same size, however, the bearing retainer 94 must be mounted on the first T-shaped punch 50 after the first T-shaped punch is inserted inside the wheel hub 20.

The tool kit of the preferred embodiment also preferably comprises various tools for installing bearing cups 22,28, oil seal 26 and a bearing cone and roller assembly 24. These installation tools are illustrated in FIGS. 12–15. Primarily, there are illustrated a bearing cup pusher disc 100 and an oil seal pusher plate 102. These types of disc 100 and the plate 102 are generally well known in the art. The pusher discs and plates of the prior art, however, do not have means for retaining the cup or seal thereto. Therefore, it is a common occurrence to observe a bearing cup, oil seal or a bearing cone and roller assembly falling off the hub during the installation thereof with the tools of the prior art. When that part falls on a concrete floor from a considerable height for example, damage to the part may occur as explained before.

Figure 12:
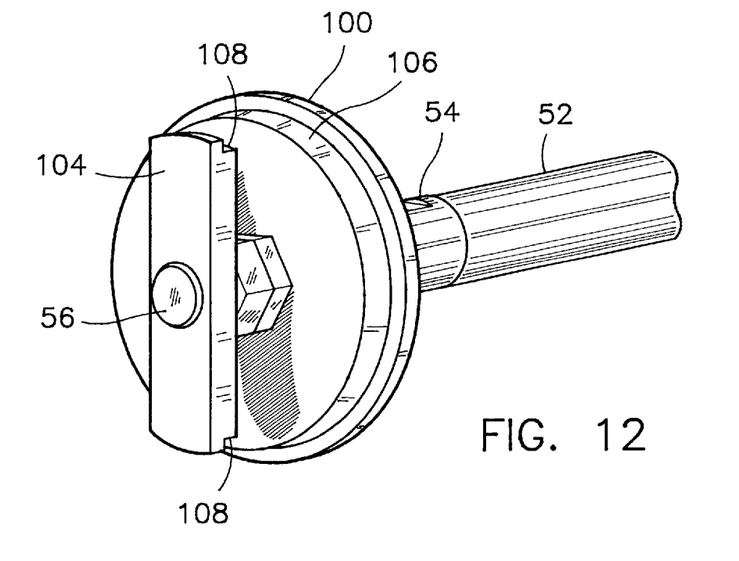
FIG. 12 is a perspective view of a bearing cup installation tool preferably included in the tool kit of the preferred embodiment.
Figure 13:
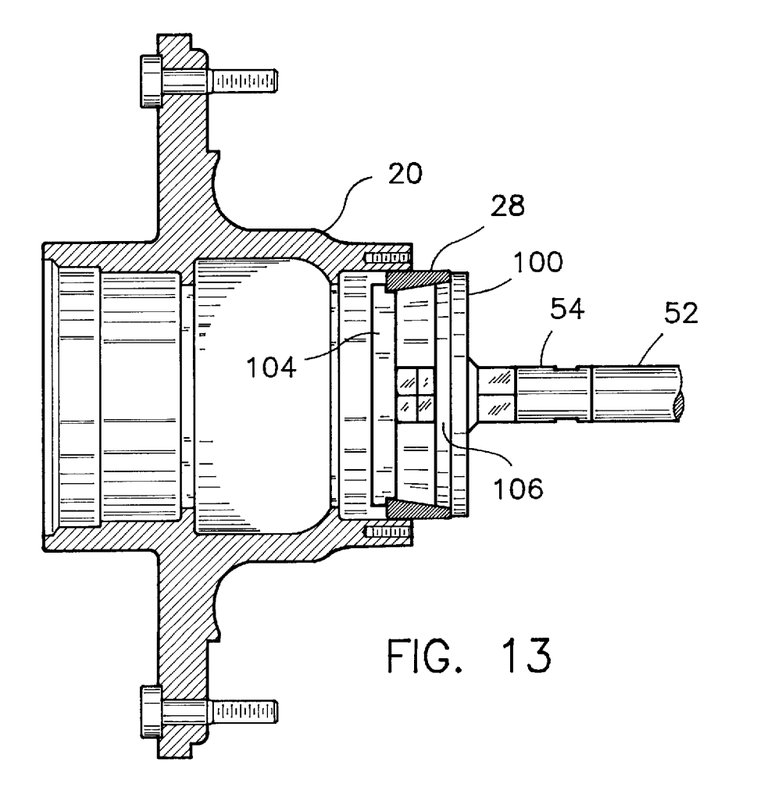
FIG. 13 is another cross-section view of a common wheel hub and a side view of a bearing cup installation tool showing a preferred installation of a bearing cup.

The bearing cup pusher disc 100 and seal pusher plate 102 of the preferred embodiment, however, have wing nuts for retaining the respective part against the tool during the installation of the part. The disc 100 has a raised central shoulder 106 having a diameter similar to an inside diameter of the bearing cup 28. A first wing nut 104 comprises a flat bar extending along the diameter of the bearing cup 28 and a pair of notches 108, one on each end of the flat bar. The dimension between the notches 108 are similar to an inside diameter of the bearing cup 28 for holding the cup in alignment with the longitudinal axis of the tool. The wing nut 104 is threaded to the threaded portion 56 of the mandrel 54.

When using this tool for installing a bearing cup 28, the cup may be precisely positioned in the opening of its seat without having to fear for dropping it. The cup may then be pushed in place while maintaining the ideal alignment.

Figure 14:
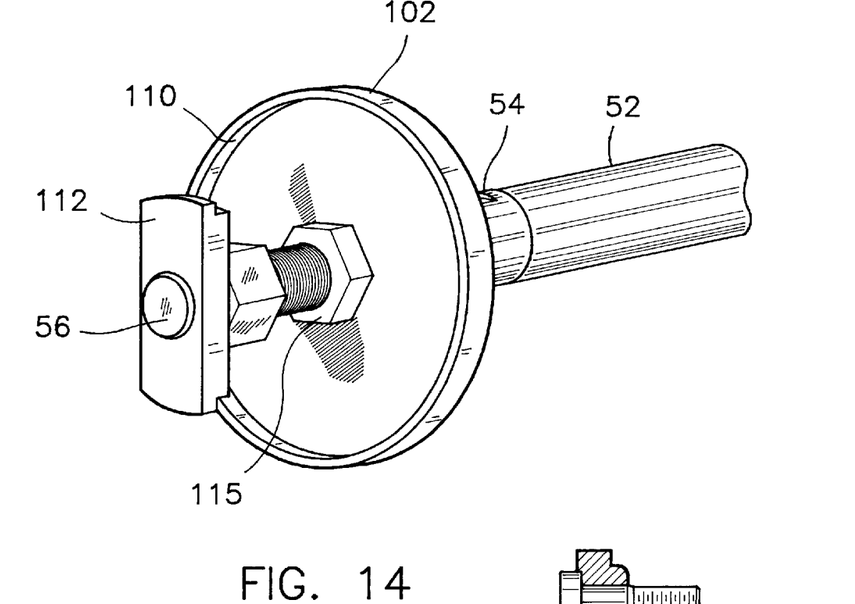
FIG. 14 illustrates a perspective view of an oil seal installation plate preferably included in the tool kit of the preferred embodiment.
Figure 15:
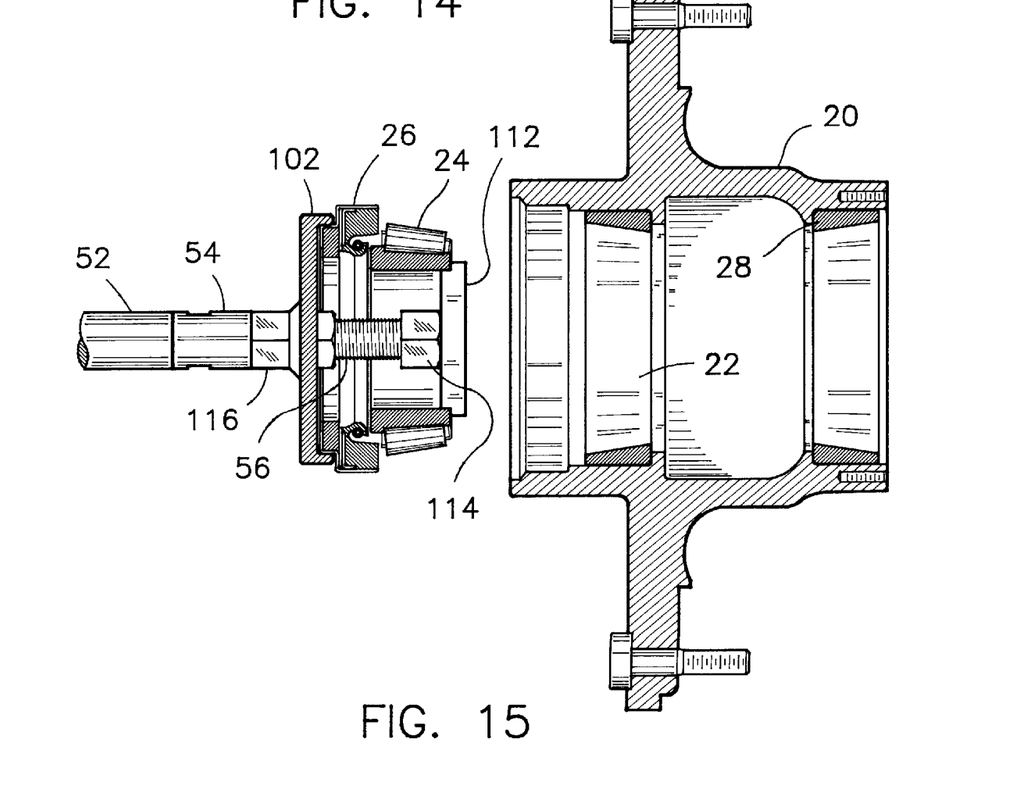
FIG. 15 is another cross-section view of a common wheel hub and oil seal installation plate illustrating a preferred installation of an oil seal.

Similarly, the circular plate 102 has a recess 110 for receiving a shoulder on the seal 26. A second wing nut 112 is mountable to the treaded portion 56 of the mandrel 54 for retaining the seal 26 and the inner cone and roller assembly 24 against the circular plate 102 during installation of the seal 26. For this purpose, the length of the nut portion 114 of the wing nut 112, the length of the threaded portion 56 and the length of the nut 116 on the circular plate 102 are sized to provide sufficient distance between the circular plate 102 and wing nut 112 to accommodate for the thickness of the seal 26 plus the thickness of the cone and roller assembly 24. Both the plate 102 and the disc 100 have a threaded hollow core and a locknut 115 is preferably provided for locking a position of the plate 102 or disc 100 on the threaded portion 56 of the mandrel.

The circular plate 102 and wing nut 112 of the preferred embodiment are particularly advantageous for confidently installing an oil seal 26 in a wheel hub 20 without having to worry about a correct positioning and proper retention and alignment of the inner cone and roller assembly 24.

Furthermore, the use of this tool as well as all tools contained in the tool kit of the preferred embodiment contributes to create better and more efficient work practices. The allowable time to inspect wheel bearings is more easily met while maintaining high workmanship standards.

Referring now to FIG. 16, the tool kit of the preferred embodiment preferably comprises interchangeable parts which have a respective thickness of no more than about two inches. The pieces of the tool kit are placeable in a compact storing case 120 as illustrated in FIG. 16, or in a common tool box drawer. It will be appreciated that when the tool kit is used by a mechanic working exclusively of wheel bearings, three additional mandrels 54' and handles 52 are preferably required for maintaining every tool in a usable mode.

While the above description provides a full and complete disclosure of the tool kit of the preferred embodiment of the present invention, various modifications, alternate constructions and equivalents may be employed without departing from the true spirit and scope of the invention. Therefore, the above description and illustrations should not be construed as limiting the scope of the invention which is defined by the appended claims.

I claim:

1. A punch for removing bearing cups from a wheel hub of a vehicle, comprising:

a handle having a longitudinal axis; and a punch head having a central axis and being mounted to said handle in a coaxial relationship with said handle; said punch head comprising a punch head body enclosing said central axis and a straight crossbar mounted on said punch head body perpendicularly to said central axis with a midpoint thereof on said central axis; said straight crossbar having first and second ends, forward and rear sides and first and second bearing engaging notches on said first and second ends respectively, on said forward side; said first and second bearing engaging notches defining therebetween an effective width of said punch head;

said first end of said straight crossbar being braced to said punch head body by a first triangular gusset having a first long side making a first acute angle with said central axis of said punch head, and said second end of said straight crossbar being braced to said punch head body by a second triangular gusset having a second long side making a second acute angle with said central axis of said punch head; said first and second triangular gussets being affixed to said rear side of said straight crossbar and extending rearward relative to said straight crossbar;

said first long side being longer than half said effective width of said punch head, and a projection of said second end of said straight crossbar measured from said first long side of said first gusset at right angle with said first long side, being shorter than said effective width of said punch head;

such that said punch is usable for working a bearing cup out of a wheel hub having two spaced-apart similar bearing cups mounted therein.

2. The punch as claimed in claim 1, wherein said punch head body, said straight crossbar and said first and second triangular gussets are rigidly connected to each other.

3. The punch as claimed in claim 1, further comprising a mandrel having a taper portion and a threaded portion; said taper portion being connected to said handle and said threaded portion being connected to said punch head body.

4. The punch as claimed in claim 3, further comprising a lock nut mounted on said threaded portion of said mandrel for locking said punch head body to said threaded portion.

5. The punch as claimed in claim 4, wherein said locknut comprises:

a bearing retainer comprising a pair of spaced-apart fingers having respective outside edges extending substantially perpendicularly from said straight crossbar and along said central axis of said punch head; each of said fmgers having a tab extending outwardly relative to said central axis and a distance between said tabs being slightly smaller than said effective width of said punch head;

such that said punch is usable for pushing a bearing cone out of a bearing cup and said bearing retainer is usable for holding said bearing cone thereto.

6. The punch as claimed in claim 5 wherein said handle comprises a taper sleeve mounted over said taper portion of said mandrel; said taper sleeve having a first taper angle and said taper portion having a second taper angle, and an angular difference between said first and second taper angles being a loose fit of about ¼ degree.

7. The punch as claimed in claim 5 , wherein each said tab on said bearing retainer extends outwardly beyond said outside edge of a respective said finger a distance of about ⅛ inch.

8. The punch as claimed in claim 5 wherein said handle has a length of about 15 inches.

9. The punch as claimed in claim 6, wherein said sleeve has a forward edge and said mandrel has a shoulder, and said forward edge is in abutment relationship with said shoulder.

10. A punch for removing bearing cones and bearing roller assemblies from wheel hubs of vehicles, comprising:

an elongated handle having a longitudinal axis;

a rigid punch head comprising a punch head body mounted on an end of said handle, and a crossbar rigidly mounted on said punch head body perpendicularly to said longitudinal axis with a midpoint thereof centered on said longitudinal axis; said crossbar having first and second ends defining therebetween an effective width of said punch head body;

a mandrel having a taper portion an a threaded portion; said taper portion being connected to said handle and said punch head body being mounted on said threaded portion; a connection of said punch head body over said mandrel being a threaded connection, and said mandrel further comprising a lock nut for locking said threaded connection, a bearing retainer mounted on said lock nut, said bearing retainer comprising a pair of spaced-apart fingers having outside edges extending substantially perpendicularly from said crossbar and each said finger having a tab extending outwardly relative to said longitudinal axis, each said tab extending outwardly beyond a respective outside edge of said finger a distance of about ⅛ inch, and a distance between said tabs being slightly smaller than said effective width;

such that when said spaced-apart fingers are inserted inside a bearing cone, said crossbar is placed against a bearing cone, and said punch is used for pushing said bearing cone out of a bearing cup, said bearing retainer is usable for retaining said bearing cone to said punch.

11. The punch as claimed in claim 10, wherein said first end of said crossbar being braced to said punch head body by a first triangular gusset having a first long side making a first acute angle with said longitudinal axis, and said second end being braced to said punch head body by a second triangular gusset having a second long side making a second acute angle with said longitudinal axis; said first long side being longer than half said effective width and a projection a said second end of said crossbar measured from said first long side in a direction perpendicular to said first long side being shorter than said effective width.

12. The punch as claimed in claim 11, wherein said punch head body, said crossbar and said first and second gussets are rigidly connected to each other.

13. The punch as claimed in claim 12, further comprising a mandrel having a taper portion and a threaded portion, said taper portion being connected to said handle and said punch head body being mounted to said threaded portion.

14. The punch as claimed in claim 13, wherein a connection of said punch head body to said mandrel is a threaded connection.

15. The punch as claimed in claim 13 wherein said handle comprises a taper sleeve connected to said taper portion of said mandrel, and said taper sleeve has a first taper angle and said taper portion has a second taper angle, and an angular difference between said first and second taper angles is a loose fit of about ¼ degree.

16. The punch as claimed in claim 15, wherein said sleeve has a forward edge and said mandrel has a shoulder, and said forward edge is in abutment relationship with said shoulder.

17. The punch as claimed in claim 16 wherein said handle has a length of about 15 inches.

* * * * *